(12) United States Patent
Zheng et al.

(10) Patent No.: US 10,768,779 B2
(45) Date of Patent: Sep. 8, 2020

(54) INSTANT MESSENGER METHOD, CLIENT AND SYSTEM BASED ON DYNAMIC IMAGE GRID

(71) Applicants: CIENET TECHNOLOGIES (BEIJING) CO., LTD., Beijing (CN); CIENET COMMUNICATIONS (BEIJING) CO., LTD., Beijin (CN)

(72) Inventors: Liang Zheng, Beijing (CN); Xibin Liu, Beijing (CN)

(73) Assignees: CIENET TECHNOLOGIES (BEIJING) CO., LTD., Beijing (CN); CIENET COMMUNICATIONS (BEIJING) CO., LTD., Beijing (CN)

(*) Notice: Subject to any disclaimer, the term of this patent is extended or adjusted under 35 U.S.C. 154(b) by 558 days.

(21) Appl. No.: 15/539,576

(22) PCT Filed: Dec. 20, 2015

(86) PCT No.: PCT/CN2015/097987
§ 371 (c)(1),
(2) Date: Aug. 18, 2017

(87) PCT Pub. No.: WO2016/101849
PCT Pub. Date: Jun. 30, 2016

(65) Prior Publication Data
US 2017/0364237 A1 Dec. 21, 2017

(30) Foreign Application Priority Data

Dec. 24, 2014 (CN) .......................... 2014 1 0818004

(51) Int. Cl.
*G06F 3/048* (2013.01)
*G06F 3/0481* (2013.01)
(Continued)

(52) U.S. Cl.
CPC ...... *G06F 3/04817* (2013.01); *G06F 3/04842* (2013.01); *G06T 11/60* (2013.01);
(Continued)

(58) Field of Classification Search
CPC .......................... G06F 3/04817; G06F 3/04842
See application file for complete search history.

(56) References Cited

U.S. PATENT DOCUMENTS 8,988,347 B2    3/2015  Iwase et al.
9,319,366 B2 *  4/2016  Kim ........................ H04L 51/18
                        (Continued)

FOREIGN PATENT DOCUMENTS

CN    102780646    11/2012
CN    104135564    11/2014
                   (Continued)

*Primary Examiner* — David E Choi
(74) *Attorney, Agent, or Firm* — Kirton McConkie; Evan R. Witt

(57) ABSTRACT

Disclosed are an instant messenger (IM) method, client and system based on a dynamic image grid, the method comprising: adding an icon and/or a phonetic symbol combination to an image grid input interface, and editing the same to generate dynamic image grid information; selecting one image grid from the image grid input interface, operating an editing sub-unit of the image grid and sequentially adding a unit instruction of the editing sub-unit to a unit instruction list; and repeating the above operation until the editing of the image grid input interface is complete, and sending the unit instruction list. Compared to a traditional IM method, the present invention enables a user to participate in the process of information creation and parsing, thus providing the user with a larger space for imagination and development, and enabling the user to express their feelings in a more enriched and interesting way.

14 Claims, 10 Drawing Sheets

(51) Int. Cl.
  *G06T 11/60* (2006.01)
  *H04L 12/58* (2006.01)
  *G06F 3/0484* (2013.01)
  *G06T 11/20* (2006.01)

(52) U.S. Cl.
  CPC .............. *H04L 51/04* (2013.01); *H04L 51/10* (2013.01); *G06T 11/206* (2013.01); *G06T 2200/24* (2013.01)

(56) References Cited

U.S. PATENT DOCUMENTS

| | | | | |
|---|---|---|---|---|
| 2006/0224452 A1* | 10/2006 | Ng | ............... | G06Q 30/02 705/14.14 |
| 2006/0253776 A1* | 11/2006 | Ohkawa | ............... | G06F 17/248 715/204 |
| 2010/0145705 A1* | 6/2010 | Kirkeby | ............ | H04M 1/72547 704/260 |
| 2014/0188997 A1* | 7/2014 | Schneiderman | ........ | H04L 51/32 709/204 |
| 2015/0058733 A1* | 2/2015 | Novikoff | .............. | G11B 27/031 715/723 |
| 2015/0074546 A1* | 3/2015 | Slawson | ............... | G06F 3/0484 715/747 |
| 2015/0186460 A1 | 7/2015 | Fuse et al. | | |
| 2015/0332470 A1* | 11/2015 | Wang | ..................... | G06T 11/00 345/581 |
| 2015/0355823 A1* | 12/2015 | Han | ..................... | G06F 3/0483 715/765 |
| 2016/0011775 A1* | 1/2016 | Guo | ................... | G06F 3/04817 715/765 |
| 2017/0364237 A1* | 12/2017 | Zheng | ................. | G06F 3/04817 |

FOREIGN PATENT DOCUMENTS

| | | |
|---|---|---|
| EP | 2192498 | 6/2010 |
| WO | 2014054308 | 4/2014 |

* cited by examiner

INSTANT MESSENGER METHOD, CLIENT AND SYSTEM BASED ON DYNAMIC IMAGE GRID

BACKGROUND

Technical Field

The present invention relates to the field of instant messaging technologies, and relates to an instant messaging method, in particular, to an instant messaging method based on a dynamic graph grid, to an instant messaging client configured to implement the method, and also to an instant messaging system including the instant messaging client.

Related Art

Instant messaging (IM for short) is an Internet-based instant information communication service. With the rapid development of the mobile Internet, the instant messaging has become a necessary online communication platform for people. For example, QQ and WeChat respectively have billions of users. By using an instant messaging tool, a user not only can have a text chat, a voice chat, and a video chat with a friend, but also can perform chat communication by using abundant system icons and custom icons and pictures, so as to greatly improve enjoyment of communication, and enrich experience in communication between the users.

However, text, voice, and video chatting manners that are commonly used by existing instant messaging tools generally place an emphasis only on accurate and effective conveyance of information expressed by users, and are lack of enjoyment in information creation and information interpretation. A communication manner in which expressions or pictures are used fails to reveal ideas and intentions of users in a rich and interesting manner in spite of a great increase of enjoyment of communication. Generally, a user can send only one icon or picture each time, and cannot perform combination, editing, or the like on the picture or the like. However, an icon or a picture only can express meaning of a single word, is used to express a mood or status of the user at a moment, but cannot express complete meaning of one sentence to be expressed by the user. Therefore, current instant messaging tools provide no more space for imagination and putting the imagination into action to users. Consequently, a degree of communication between the users is limited to some extent.

SUMMARY

With regard to disadvantages of the prior art, the first technical problem to be resolved by the present invention is to provide an instant messaging method based on a dynamic graph grid.

Another technical problem to be resolved by the present invention is to provide an instant messaging client configured to implement the foregoing method.

Still another technical problem to be resolved by using the present invention is to provide an instant messaging system including the foregoing instant messaging client.

To achieve the foregoing objectives of the present invention, the following technical solutions are used in the present invention.

According to a first aspect of embodiments of the present invention, an instant messaging method based on a dynamic graph grid is used to implement sending of dynamic graph grid information is provided, including the following steps: adding an icon and/or a soundmark combination to a graph grid input interface, and editing the same to generate dynamic graph grid information.

Preferably, the editing the same to generate dynamic graph grid information includes the following steps:
selecting one graph grid from the graph grid input interface;
operating an editing sub-unit of the graph grid and sequentially adding a meta instruction of the editing sub-unit to a meta instruction list; and
repeating the foregoing operations until editing of the graph grid input interface is completed, and then, sending the meta instruction list.

Preferably, the method includes: determining the editing sub-unit according to whether there is an icon/soundmark in the graph grid;
selecting the editing sub-unit according to a dynamic expression form of the icon/soundmark; and
adding a meta instruction generated by the editing sub-unit to the generated meta instruction list.

Preferably, the editing sub-unit comprises grid moving sub-unit, icon/soundmark showing sub-unit, icon/soundmark hiding sub-unit, and icon/soundmark deleting sub-unit, wherein the grid moving sub-unit is used to implement moving of an icon in a graph grid; the icon/soundmark showing sub-unit is used to load an icon/soundmark to a graph grid; the icon/soundmark hiding sub-unit is used to hide an icon/soundmark; and the icon/soundmark deleting sub-unit is used to delete an icon/soundmark showing meta instruction from the meta instruction list.

Preferably, the method includes: when selecting the grid moving sub-unit, drawing a grid moving path in the graph grid input interface;
sequentially saving center point coordinates of graph grids in the path into a path table; and
generating a grid moving meta instruction by using an instruction name, position identifiers of starting point and end point graph grids, and the path table, and adding the grid moving meta instruction to the meta instruction list.

Preferably, the path table further includes a soundmark number of the graph grid in the path.

Preferably, the method includes: when selecting the icon/soundmark showing sub-unit, selecting an icon/soundmark, and generating an icon/soundmark showing meta instruction by using an instruction name, a graph grid position identifier, and an icon number/soundmark number.

Preferably, the method includes: when selecting the icon/soundmark hiding sub-unit, generating an icon/soundmark hiding meta instruction by using an instruction name and a graph grid position identifier.

Preferably, the editing the same to generate dynamic graph grid information includes the following steps:
sequentially adding the selected icon and/or soundmark into a graph grid of the graph grid input interface, and after editing of the graph grid input interface is completed, generating a piece of graph grid information to store the same;
editing another piece of graph grid information and changing a position of the icon/soundmark in the previous graph grid input interface; and
repeating the foregoing operations to send a plurality of pieces of graph grid information as dynamic graph grid information.

According to a second aspect of the embodiments of the present invention, an instant messaging method based on a dynamic graph grid is used to implement receiving of dynamic graph grid information is provided, including the following steps:

initializing a graph grid control list;

sequentially extracting and executing a meta instruction in a meta instruction list;

searching for control information of a graph grid according to a graph grid position identifier in the meta instruction; and extracting coordinate information in the control information, and displaying a icon and/or soundmark in the graph grid according to an information library identifier in the meta instruction.

Preferably, when executing a grid moving meta instruction, the method includes:

deleting a graph at center point coordinates of a starting point graph, and deleting an icon number;

obtaining an icon corresponding to the icon number from the information library, sequentially obtaining a coordinate center point of a next graph grid from the path table, displaying the icon at the point, and deleting the icon after a preset time until the path is completed; and when arriving at an end point graph grid, displaying the icon at the coordinate center point, and saving the icon number into the control information.

Preferably, when executing a grid moving meta instruction, the method includes: if there is a soundmark number in the path table, obtaining a corresponding soundmark and playing the same.

Preferably, when executing an icon showing meta instruction, the method includes:

obtaining an icon corresponding to an icon number from an information library, obtaining center point coordinates in graph grid control information, and displaying the icon at the point while saving the icon number into the control information.

Preferably, when executing a soundmark showing meta instruction, the method includes:

obtaining a soundmark corresponding to a soundmark number from an information library, obtaining lower right point coordinates in graph grid control information, and displaying the soundmark at the point while playing the soundmark and saving the soundmark number into the control information.

Preferably, when executing an icon hiding meta instruction, the method includes:

obtaining center point coordinates in graph grid control information, and removing an icon at the point while deleting an icon number from the control information.

Preferably, when executing a soundmark hiding meta instruction, the method includes:

obtaining lower right point coordinates in graph grid control information, and removing a graph at the point while deleting a soundmark number from the control information.

According to a third aspect of the embodiments of the present invention, an instant messaging client which be configured to implement the foregoing instant messaging method is provided, including an information collection module, a graph grid control module, a graph grid editing module, an information storage module, and an information library, where the information collection module is configured to obtain contact information of a graph grid input interface, and determine a selected graph grid according to the contact information;

the graph grid control module obtains control information of the graph grid according to a position identifier of the selected graph grid, and controls display of an icon and play of a soundmark according to the control information;

the information library is configured to store the icon and/or the soundmark;

the graph grid editing module updates the control information according to a selected editing sub-unit, and generates a meta instruction list; or parses a received meta instruction list, and updates the control information; and the information storage module is configured to store the received meta instruction list and a to-be-sent information instruction list.

An instant messaging system based on a dynamic graph grid includes an instant messaging server and the foregoing instant messaging client;

The instant messaging server is configured to store and forward graph grid information of the instant messaging client.

Preferably, the instant messaging server includes an information library that keeps in synchronization with that of the instant messaging client.

By using the instant messaging method provided in the present invention, a user can completely present an intention or idea to be expressed by freely combining an icon and a soundmark in a graph grid and editing a track of each icon to generate a dynamic graph grid together with a simple sound effect. Compared with conventional instant messaging manners, the present invention enables a user to take part in a process of creating and parsing information, and provides more space for imagination and putting the imagination into action to the user, so that an emotion of the user is revealed in a rich and interesting manner.

DETAILED DESCRIPTION

Figure 1A:
FIG. 1*a*.
Figure 1B:
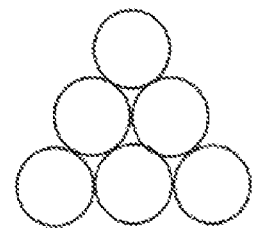
FIG. 1*b*, FIG. 1*c*, and FIG. 1*d* are respectively schematic diagrams of styles of graph grid input interfaces in the present invention.
Figure 1C:
Figure 1D:
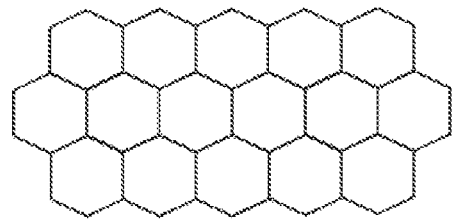

The following further describes technical contents of the present invention in detail with reference to the accompanying drawings and specific embodiments.

In an instant messaging method provided in the present invention, an information input interface thereof is in a form of a graph grid. The graph grid herein is an instant message presentation form. An information input interface is divided into several grids, and a user loads icons and/or soundmarks into the grids by means of free combination, so as to express a specific idea of the user by means of a combination of the icons and soundmarks in the grids. The user may freely place a combination of the icons and/or soundmarks in an information library at any position of the graph grid interface and meanwhile, may also edit a track and a display form of each icon, to generate instant messaging information based on a dynamic graph grid. Compared with conventional instant messaging manners using words and/or voices, the present invention uses dynamic graph grid information and can reveal ideas and intentions of users in a vivid, rich, and interesting manner, so as to improve creation and enjoyment of the instant messaging information.

In the graph grid input interface provided in the present invention, the whole input interface is divided into several grids. When the graph grid input interface is divided, a coordinate area of each graph grid needs to be recorded, and each graph grid is configured with an ID number. The ID number is a unique identifier of a graph grid, and relevant of the graph grid may be found by searches according to the ID number. In the present invention, a style of the whole graph grid interface is not limited, and a specific form may be a rectangle, a square, a circle, a hexagon, and the like in FIG. 1a, FIG. 1b, FIG. 1c, and FIG. 1d. Moreover, in actual application, the user not only can freely select a graph grid style, but also can select a size of the graph grid. For example, a specification is 3*3, 4*4, or the like. Because instant interactive information in the present invention includes a graph grid ID number, a sending party and a receiving party both can accurately receive the graph grid information, sent by the other party, without being limited by the graph grid style.

In the present invention, a graph grid serves as a control unit. Control information of each control unit includes: center point coordinates expressed by a pixel, an icon number, lower right point coordinates expressed by a pixel, and a soundmark number. In the present invention, position coordinates expressed by pixels are used, to ensure that loading of icons and/or soundmarks is not limited by screen resolution of a device. During initialization, the whole graph grid input interface is configured with a graph grid control list. The list records each graph grid ID number and control information. After a user clicks one graph grid on the graph grid input interface, an ID number of a graph is first obtained. Then, the list is searched for control information according to the ID number. The control information records loading positions of an icon and a soundmark of a graph grid. After the user selects the icon and the soundmark, they are loaded and displayed at a corresponding graph grid position according to the control information. The following focuses on introducing editing and generation processes of dynamic graph grid information in detail.

Embodiment 1

In the instant messaging method of this embodiment, after an dynamic editing operation is performed on a graph grid in a graph grid input interface, dynamic information of the whole graph grid input interface is sent as interactive information to a receiving end. A specific implementation process includes the following step: first selecting one graph grid from the graph grid input interface and determining an editing instruction according to data of a graph grid control unit; then, editing, according to the editing instruction, a dynamic expression form of an icon/soundmark added to the graph grid, and sequentially adding a generated meta instruction to a meta instruction list; and subsequently, repeating the foregoing operations to perform dynamic editing on a plurality of graph grids, and after a user completes graph grid editing of the grid input interface according an idea and an intention, sending the meta instruction list as instant interactive information.

Figure 2:
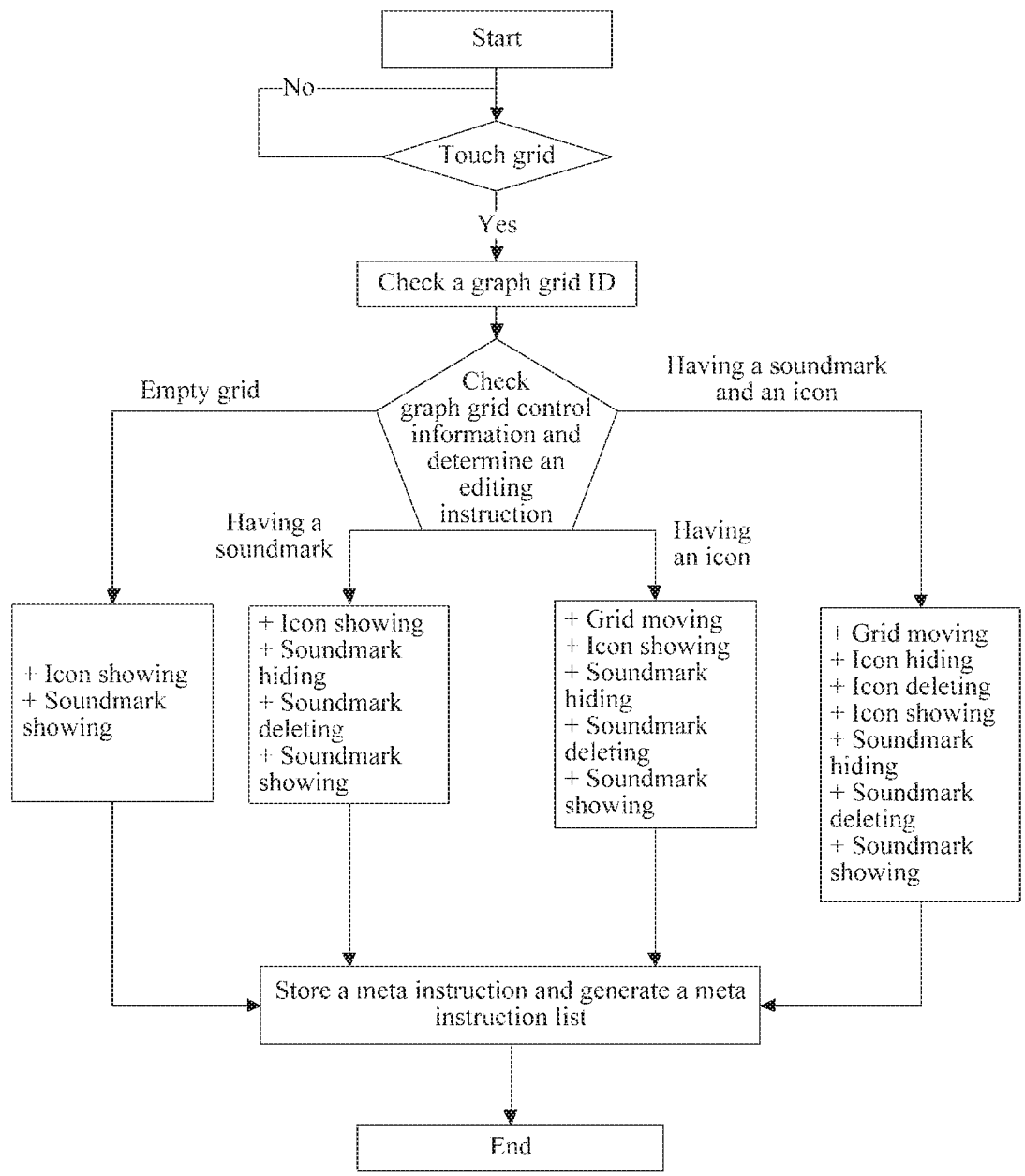
FIG. 2 is a flowchart of editing dynamic graph grid information in an embodiment of the present invention.

Referring to FIG. 2, after the user selects a graph grid from the graph grid input interface, an ID number of the graph grid is first obtained according to position coordinates of the graph grid, and a corresponding control unit is checked according to the ID number of the graph grid. An editing operation to be performed in the next step is determined according to whether there is an icon or a soundmark. The present invention includes various editing sub-units, and dynamic presentation of an icon/soundmark is implemented by means of a sub-unit or a combination of sub-units. The editing sub-unit includes: an icon showing sub-unit, a soundmark showing sub-unit, an icon hiding sub-unit, a soundmark hiding sub-unit, an icon deleting sub-unit, a soundmark deleting sub-unit, and a grid moving sub-unit. During editing, after a sub-unit is selected, an editing operation is performed, and a generated meta instruction is sequentially added to a meta instruction list. The meta instruction list serves as a piece of interactive information between clients, and is sent to a receiving end. After the meta instruction list is completed, the meta instruction list may be stored into a graph grid information library, and may also be obtained to re-edit or sent. The following describes several cases of determining to execute an editing instruction according to control information:

(1) Check an empty grid state. When a user edits new information, if a graph grid is in an empty grid state, the user needs to add an icon and/or soundmark. Therefore, an editing instruction of a next step is: showing an icon and showing a soundmark. Then, editing instructions for showing an icon and showing a soundmark are executed.

(2) Check a state of only having a soundmark. After soundmark showing is executed in a graph grid, control information of the graph grid only includes a soundmark number. A user may perform operations of adding an icon, deleting the soundmark, and dynamically displaying the soundmark on the graph grid. When it is checked that the graph grid only includes a soundmark number, an editing instruction of a next step includes: icon showing, soundmark hiding, soundmark deleting, and soundmark showing. Dynamic soundmark editing may be implemented by first hiding a soundmark and then showing the soundmark.

(3) Check a state of only having an icon. When the graph grid only includes an icon, an editing instruction of a next step includes: grid moving, icon hiding, icon deleting, icon showing, and soundmark showing. A user may perform operations of dynamically displaying an icon, deleting the icon, and adding a soundmark on the graph grid. The present invention relates two dynamic forms, including grid moving of an icon, and flashing of an icon. Icon flashing is implemented by means of icon hiding and soundmark showing editing instructions. Icon grid moving is completed by means of a grid moving instruction, and a specific implementation process of grid moving is described in the following.

(4) Check that an icon and a soundmark exist at the same time. Operations that can be performed on a graph grid include dynamically displaying an icon and a soundmark and deleting the icon and the soundmark. Therefore, editing instructions include: grid moving, icon hiding, icon deleting, icon showing, soundmark hiding, soundmark deleting, and soundmark showing. After adding icon and soundmark information, a user may delete an icon and a soundmark to perform dynamic editing on the icon and the soundmark. The dynamic editing of an icon includes grid moving of the icon and flashing of the icon and the soundmark.

It should be noted that dynamic presentation forms of an icon/soundmark of the present invention are not limited to the foregoing ones. Other dynamic presentation forms implemented by using the foregoing editing instruction also fall within the protection scope of the present invention.

When each editing instruction is executed, a corresponding instruction is first stored into a meta instruction list according to a selected operation, and then, corresponding display and control operations are further performed internally. The following specifically describes an implementation process of each editing instruction.

Figure 3:
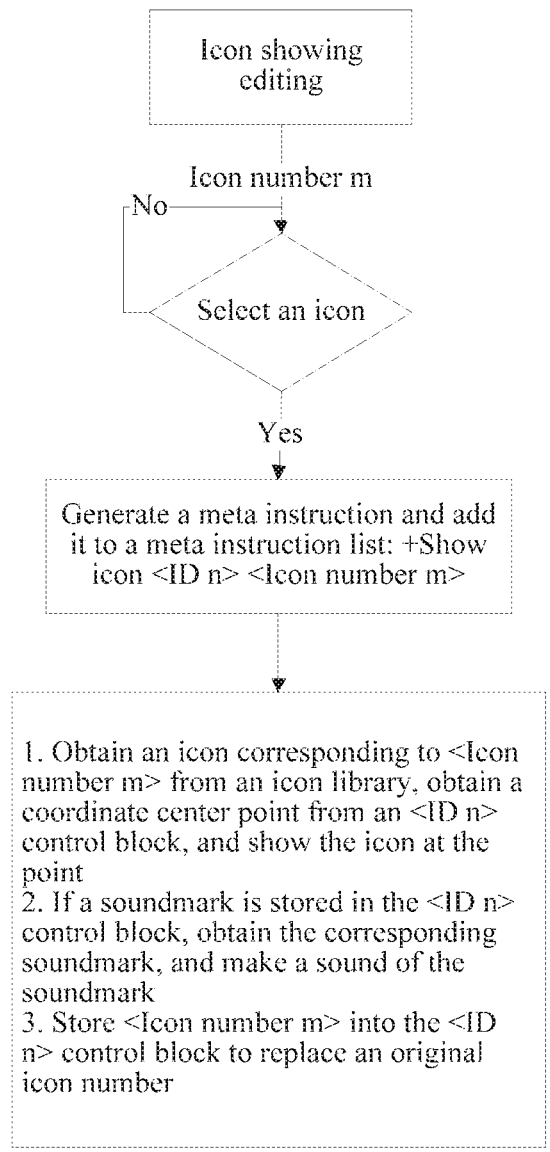
FIG. 3 is a flowchart of editing of icon showing in an embodiment of the present invention.

Icon Showing Editing:

Refer to FIG. 3, when an icon showing editing instruction is executed, first, a user is waited to select an icon. After the user selects an icon, an icon number of the icon is obtained, and an icon showing meta instruction is generated and added into a meta instruction list. The icon showing meta instruction includes: +icon showing, an ID number, and an icon number.

When the icon showing meta instruction is executed, an icon corresponding to the icon number is first obtained from an icon library, a coordinate center point is obtained from a control unit of a graph grid of the corresponding ID number, and the icon is displayed at the point. If the control unit of the graph grid stores a soundmark, a corresponding soundmark is obtained and played. Finally, the icon number is stored into control information to replace an original icon number. Moreover, for editing of new information, it is only needed to store an icon number into the control unit.

Figure 4:
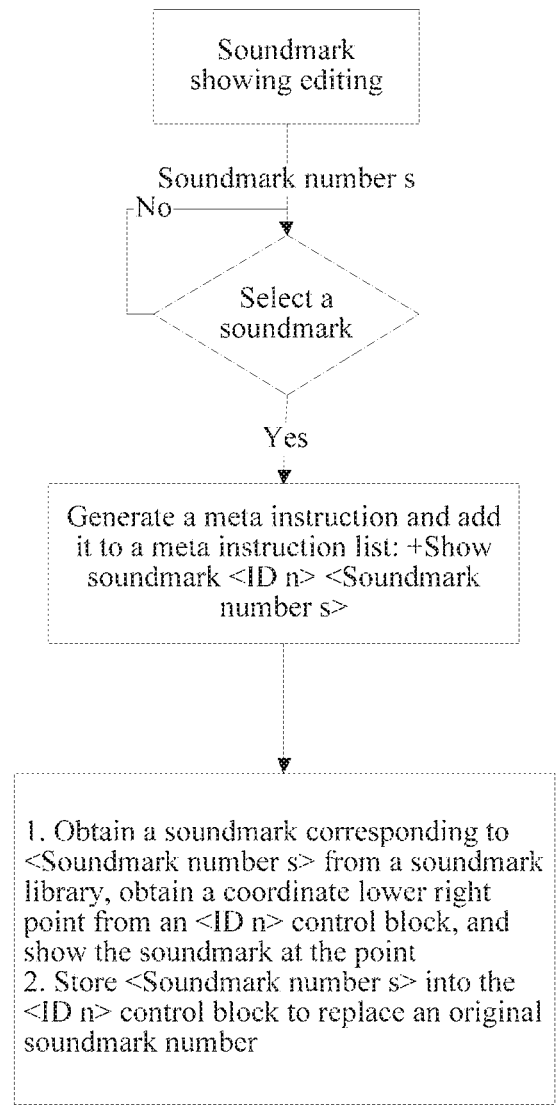
FIG. 4 is a flowchart of editing of soundmark showing in an embodiment of the present invention.

Soundmark Showing Editing:

As shown in FIG. 4, after a user selects soundmark showing editing, it is checked whether a soundmark is selected. According to a soundmark number of the selected soundmark, a soundmark showing meta instruction is generated and added into a meta instruction list. The soundmark showing meta instruction includes: +soundmark showing, an ID number, and a soundmark number.

When the meta instruction is executed, a soundmark corresponding to the soundmark number is obtained from a soundmark library, a coordinate lower right point is obtained from the graph grid control unit, and the soundmark is displayed at the point. Subsequently, the soundmark number is stored into control information to replace an original soundmark number. When new information is edited, it is only needed to store a soundmark number.

Figure 5:
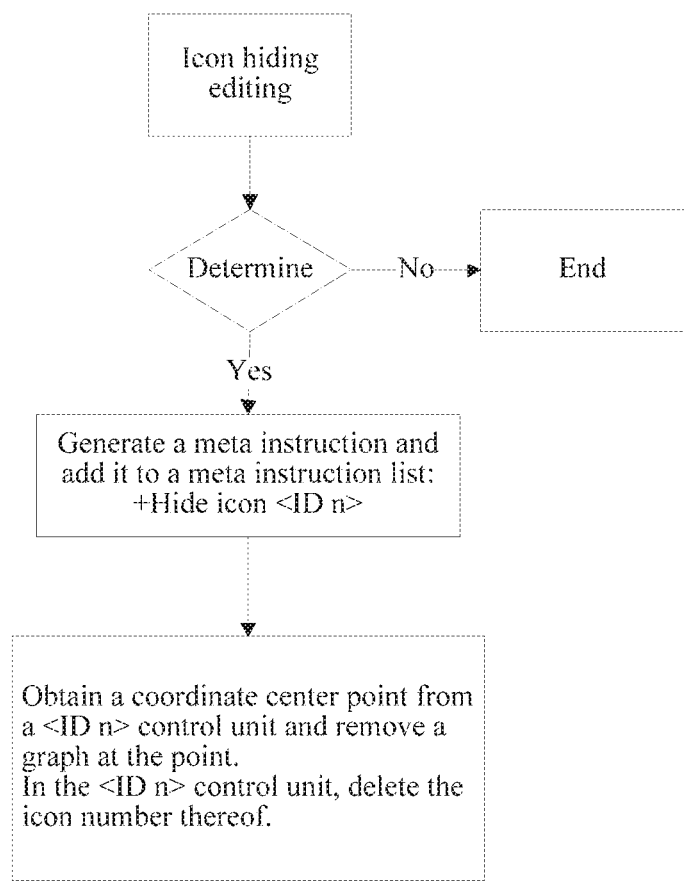
FIG. 5 is a flowchart of editing of icon hiding in an embodiment of the present invention.

Icon/Soundmark Hiding Editing:

Referring to FIG. 5, after a user selects icon hiding editing, an icon hiding meta instruction is first generated, and then, the icon hiding meta instruction is sequentially stored into a meta instruction list. The icon hiding meta instruction is: +icon hiding and an ID number.

Figure 6:
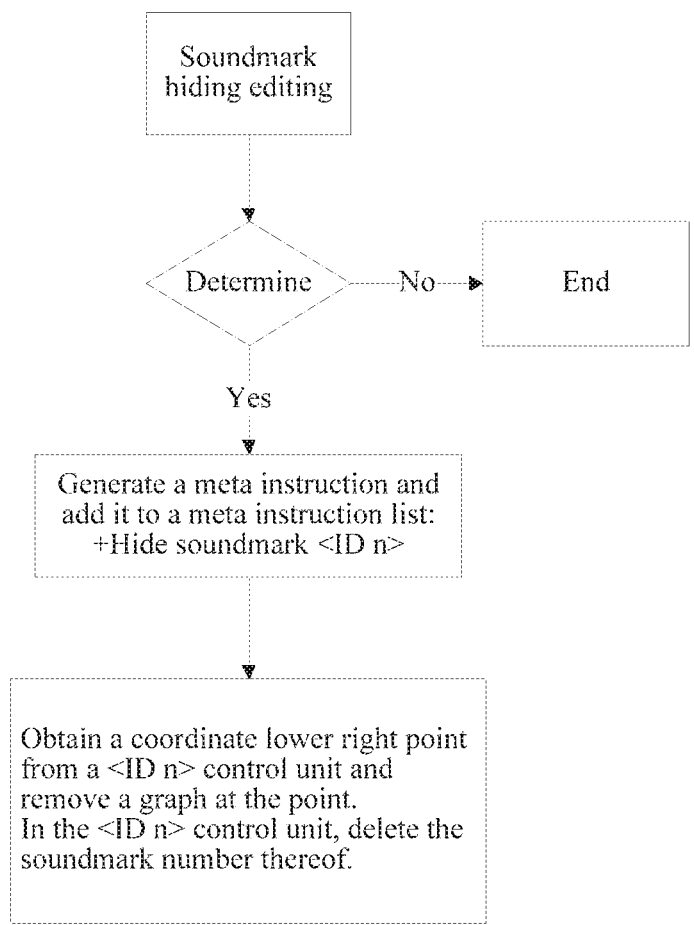
FIG. 6 is a flowchart of editing of soundmark hiding in an embodiment of the present invention.

When the meta instruction is executed, center point coordinates are obtained from control information of a graph grid of the ID number, and a graph at the point is removed while deleting an icon number from the control information. A soundmark hiding process is similar to an icon hiding process. Refer to FIG. 6 for details. A generated soundmark hiding meta instruction is sequentially added into the meta instruction list. The soundmark hiding meta instruction is: +soundmark hiding and an ID number. Lower right point coordinates are obtained from a control unit of a graph grid of the ID number, and a graph at the point is removed while deleting a soundmark number.

Figure 7:
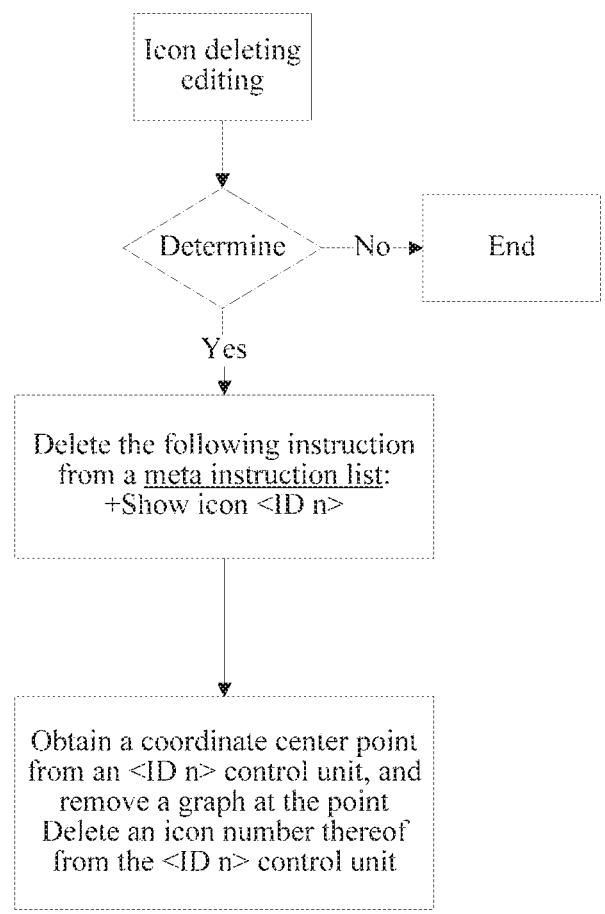
FIG. 7 is a flowchart of editing of icon deleting in an embodiment of the present invention.
Figure 8:
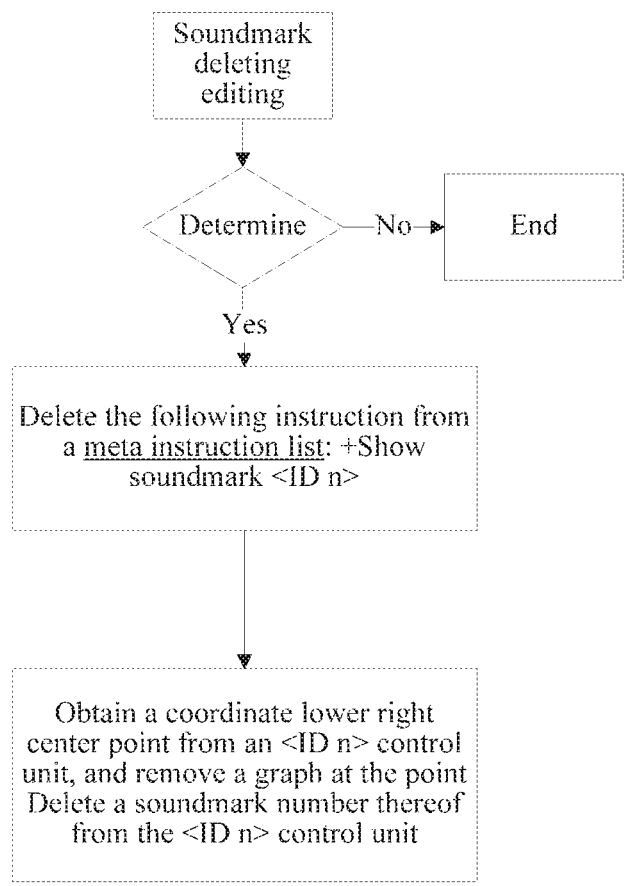
FIG. 8 is a flowchart of editing of soundmark deleting in an embodiment of the present invention.

Icon/Soundmark Deleting Editing:

Referring to FIG. 7 and FIG. 8, after an icon and a soundmark are inserted into a graph grid, when a user needs to delete them, icon deleting and soundmark deleting editing instructions may be used. After the editing instructions am selected, icon showing and soundmark showing meta instructions are deleted from the meta instruction list, and meanwhile, an icon number and a soundmark number are deleted from the control unit. The instructions are only limited to editing operations on a local client.

Figure 9:
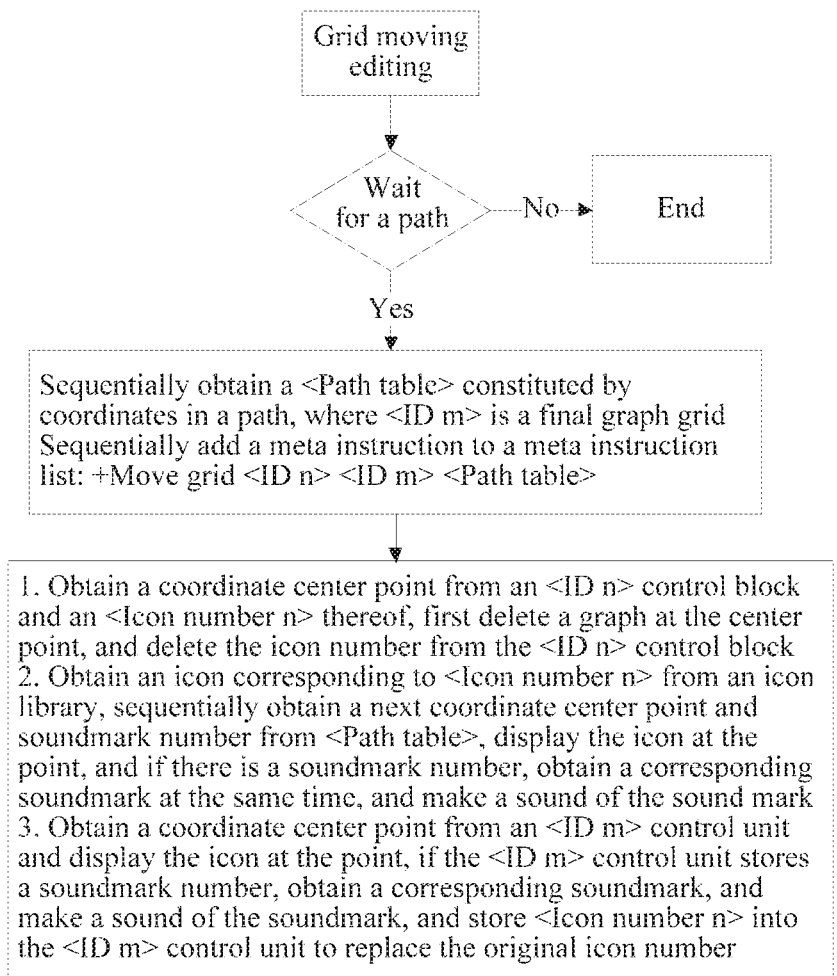
FIG. 9 is a flowchart of editing of grid moving in an embodiment of the present invention.

Grid Moving Editing:

Referring to FIG. 9, after a user selects grid moving sub-unit, a grid moving path is first drawn. The path is a column of ID numbers. Corresponding coordinate center points and soundmark numbers are obtained from graph grid control units corresponding to the column of ID numbers to from a sequential <Path table>. Then, according to path information, a grid moving meta instruction is generated and added into a meta instruction list. The grid moving meta instruction is: +grid moving <Starting point ID number> <End point ID number> <Path table>. It is assumed that an icon showing editing instruction is executed, a selected graph grid ID is n, and an icon number is m.

When the meta instruction is executed, a coordinate center point and an icon number m thereof are first obtained from control information of a starting point graph grid, a graph at the center point is first deleted, and then, the icon number is deleted from the control information. Subsequently, an icon corresponding to the icon number m is obtained from an icon library. A next coordinate center point and soundmark number are sequentially obtained from the path table, the icon is displayed at the point, and if there is a soundmark number, a corresponding soundmark is obtained at the same time, and the soundmark is played. Then, deletion is performed after a preset time (for example, several seconds) until the path is completed. Finally, after a graph grid having an end point ID is arrived at, after the icon is displayed and/or the soundmark is played, the icon number m is stored into the control unit to replace an original icon number.

When processing received graph grid information, a client sequentially extracts each meta instruction. When an information instruction is executed, after a graph grid control list is initialized, instruction information is sequentially extracted from the meta instruction list. Control information of a graph grid is searched for according to an ID number of the graph grid. Center point coordinates and lower right point coordinates are obtained according to the control unit, an icon is displayed and/or a soundmark is played, and then an icon number and a soundmark number are stored into the control information. Because a process of executing a meta instruction after client editing is similar to a process of executing an meta instruction on a receiving end, the foregoing meta instruction execution method is applicable to both a client and a receiving end. A processing process of the receiving end is not described herein in detail.

Embodiment 2

Different from performing dynamic editing on a single graph grid in Embodiment 1, in this embodiment, a generation principle of a dynamic graph grid is similar to an animation production process. First, graph grid information of a whole graph grid interface is edited to generate a static graph grid. For an editing process of a static graph grid, it is only needed to obtain an ID number of a graph grid, an icon number, and a soundmark number, so as to generate a piece of grid information. For a specific implementation process, refer to application documents of the applicant's "INSTANT MESSAGING METHOD, CLIENT, AND SYSTEM BASED ON GRAPH GRID". After a plane graph grid is completed, it may be stored into a graph grid information library to perform editing of a second static graph grid, or the static graph grid may be obtained to re-edit and send. When a second static graph grid is produced, a position of an icon in the first graph grid may be changed, and a motion track of an icon is recorded, or a new icon is selected and filled into the graph grid. After each graph grid is completed sequentially, a dynamic graph grid is presented in a continuous playing manner, to express an intention and an idea of a user.

Embodiment 3

Figure 10:
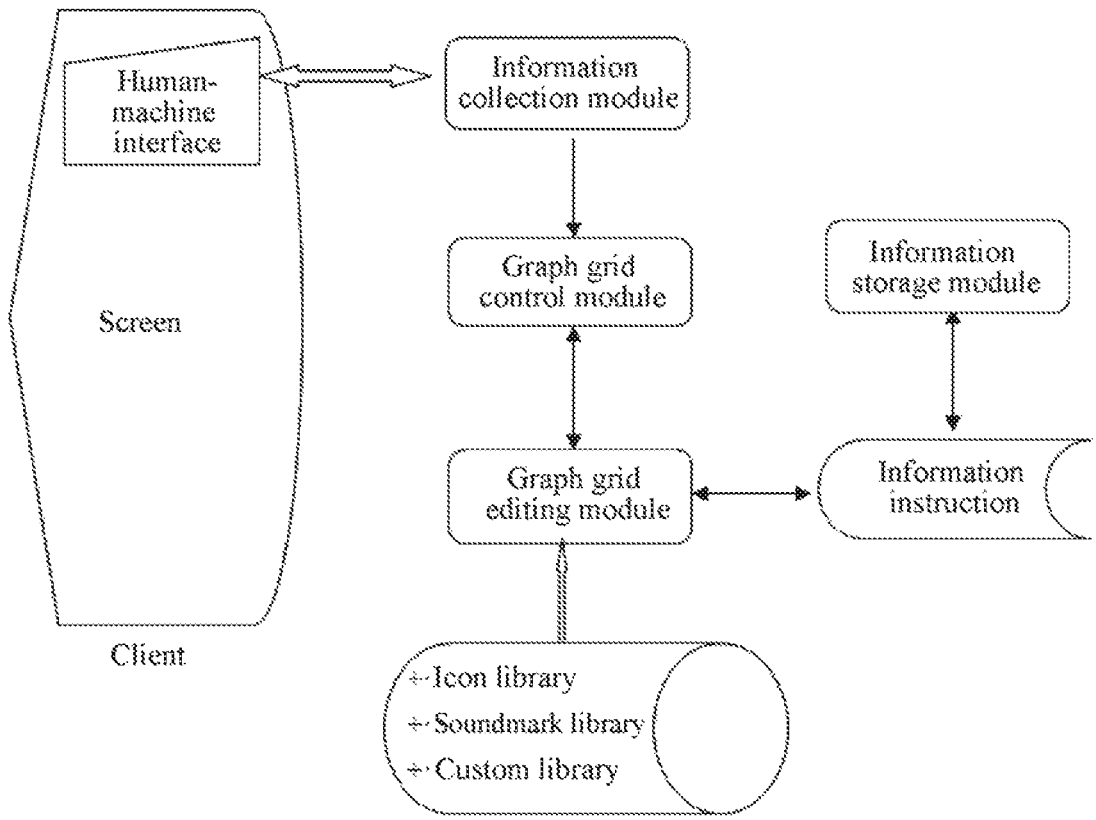
FIG. 10 is a schematic structural diagram of an instant messaging client in an embodiment of the present invention.

Referring to FIG. 10, the present invention further provides an instant messaging client configured to implement the foregoing instant messaging method. The client includes an information collection module, a graph grid control module, a graph grid editing module, an information storage module, and an information library.

The information collection module is configured to obtain contact information of a graph grid input interface, and determine a selected graph grid position identifier according to the contact information. A unique ID number configured for each graph grid.

The graph grid control module is configured to control display of an icon and a soundmark and play of sound. The module includes a graph grid control list. ID numbers and control information of all graph grids are configured in the list. The graph grid control list is searched for according to an ID number obtained by an information collection unit to obtain the control information of the graph grid.

The information library includes an icon library and a soundmark library. The information library not only includes information about an icon, a picture and a soundmark that is configured by the client, but also includes information about, for example, a self-defined icon of a local user, an icon, or a soundmark. Unique identifiers are configured for an icon and a soundmark and are uniformly referred to as information library identifiers.

The graph grid editing module includes editing sub-units such as an icon showing sub-unit, a soundmark showing sub-unit, an icon hiding sub-unit, a soundmark hiding sub-unit, an icon deleting sub-unit, a soundmark deleting sub-unit, and a grid moving sub-unit. The graph grid editing module performs an editing operation according to the selected editing sub-unit, generates a meta instruction list, and stores the meta instruction list into an information storage unit. With regard to received graph grid information, the graph grid editing module parses the meta instruction list, obtains information library identifiers and a graph grid position identifier, and updates control information.

The information storage module is the graph grid information library, and is configured to store information instructions to be sent and received. When the graph grid information is edited, the graph grid editing module sequentially completes storage of the information instructions of the graph grids on the whole graph grid input interface, and sends the information instructions as one piece of graph grid information. However, for receiving the graph grid information, the information instructions are sequentially obtained, and are delivered to the graph grid editing module for updating the control information.

Embodiment 4

Figure 11:
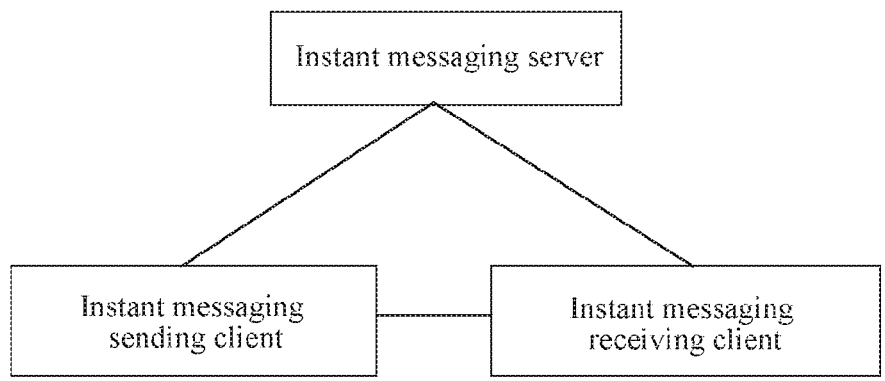
FIG. 11 is a schematic structural diagram of an instant messaging system in an embodiment of the present invention.

Referring to FIG. 11, the present invention further provides an instant messaging system based on a dynamic graph grid. The system includes an instant messaging server and the foregoing instant messaging client. The instant messaging server is mainly responsible for providing storage and forwarding services of graph grid information, and sending an instant message to the instant messaging client after login; and the instant messaging client is configured to edit, send, receive, notify, and display a graph grid message. In actual communication, the instant messaging server is configured to receive the graph grid information sent by the instant messaging client, store content of the graph grid information and then forward the information to another receiving instant messaging client. The instant messaging server is configured with an information library. The information library of the instant messaging server needs to be kept in synchronization with the information library of the instant messaging client, so as to ensure accurate loading of the icon and the soundmark between the clients.

The foregoing describes the instant messaging method, client, and system based on a dynamic graph grid provided in the present invention in details. For a person skilled in the art, any obvious modification made to the present invention without departing from essence and spirit of the present invention will constitute a violation of a patent right of the present invention, and the person shall bear corresponding legal liabilities.

What is claimed is:

1. An instant messaging method based on a dynamic graph grid, used to implement sending of dynamic graph grid information, comprising the following steps:
   adding an icon and/or a soundmark combination to a graph grid input interface;
   selecting one graph grid from the graph grid input interface;
   operating an editing sub-unit of the graph grid and sequentially adding a meta instruction of the editing sub-unit to a meta instruction list, wherein the editing sub-unit comprises a grid moving sub-unit which is used to implement moving of an icon in a graph grid, when selecting the grid moving sub-unit, drawing a grid moving path in the graph grid input interface;
   sequentially saving center point coordinates of graph grids in the path into a path table; and
   generating a grid moving meta instruction by using an instruction name, position identifiers of starting point and end point graph grids, and the path table, and adding the grid moving meta instruction to the meta instruction list; and
   repeating the foregoing operations until editing of the graph grid input interface is completed, and then, sending the meta instruction list.

2. The instant messaging method according to claim 1, further comprising:
   determining the editing sub-unit according to whether there is an icon/soundmark in the graph grid;
   selecting the editing sub-unit according to a dynamic expression form of the icon/soundmark; and
   adding a meta instruction generated by the editing sub-unit to the generated meta instruction list.

3. The instant messaging method according to claim 1, wherein the editing sub-unit further comprises icon/soundmark showing sub-unit, icon/soundmark hiding sub-unit, and icon/soundmark deleting sub-unit, wherein the icon/soundmark showing sub-unit is used to load an icon/soundmark to a graph grid; the icon/soundmark hiding sub-unit is used to hide an icon/soundmark; and the icon/soundmark deleting sub-unit is used to delete an icon/soundmark showing meta instruction from the meta instruction list.

4. The instant messaging method according to claim 1, wherein the path table further comprises a soundmark number of the graph grid in the path.

5. The instant messaging method according to claim 3, wherein further comprises:
  when selecting the icon/soundmark showing sub-unit, selecting an icon/soundmark, and generating an icon/soundmark showing meta instruction by using an instruction name, a graph grid position identifier, and an icon number/soundmark number.

6. The instant messaging method according to claim 3, wherein further comprises:
  when selecting the icon/soundmark hiding sub-unit, generating an icon/soundmark hiding meta instruction by using an instruction name and a graph grid position identifier.

7. An instant messaging method based on a dynamic graph grid, used to implement receiving of dynamic graph grid information, comprising the following steps:
  initializing a graph grid control list;
  sequentially extracting and executing a meta instruction in a meta instruction list;
  when executing a grid moving meta instruction, deleting a graph at center point coordinates of a starting point graph, and deleting an icon number;
  obtaining an icon corresponding to the icon number from an information library, sequentially obtaining a coordinate center point of a next graph grid from the path table, displaying the icon at the point, and deleting the icon after a preset time until the path is completed;
  when arriving at an end point graph grid, displaying the icon at the coordinate center point, and saving the icon number into the control information;
  searching for control information of a graph grid according to a graph grid position identifier in the meta instruction; and
  extracting coordinate information in the control information, and displaying a icon and/or soundmark in the graph grid according to an information library identifier in the meta instruction.

8. The instant messaging method according to claim 7, wherein further comprises:
  when executing a grid moving meta instruction, if there is a soundmark number in the path table, obtaining a corresponding soundmark and playing the same.

9. The instant messaging method according to claim 7, wherein further comprises: when executing an icon showing meta instruction,
  obtaining an icon corresponding to an icon number from an information library, obtaining center point coordinates in graph grid control information, and displaying the icon at the point while saving the icon number into the control information.

10. The instant messaging method according to claim 7, wherein further comprises: when executing a soundmark showing meta instruction,
  obtaining a soundmark corresponding to a soundmark number from an information library, obtaining lower right point coordinates in graph grid control information, and displaying the soundmark at the point while playing the soundmark and saving the soundmark number into the control information.

11. The instant messaging method according to claim 7, wherein further comprises: when executing an icon hiding meta instruction,
  obtaining center point coordinates in graph grid control information, and removing an icon at the point while deleting an icon number from the control information.

12. The instant messaging method according to claim 7, wherein further comprises: when executing a soundmark hiding meta instruction,
  obtaining lower right point coordinates in graph grid control information, and removing a graph at the point while deleting a soundmark number from the control information.

13. An instant messaging client, configured to implement an instant messaging method according to claim 1, comprising an information collection module, a graph grid control module, a graph grid editing module, an information storage module, and an information library, wherein
  the information collection module is configured to obtain contact information of a graph grid input interface, and determine a selected graph grid according to the contact information;
  the graph grid control module obtains control information of the graph grid according to a position identifier of the selected graph grid, and controls display of an icon and play of a soundmark according to the control information;
  the information library is configured to store the icon and/or the soundmark;
  the graph grid editing module updates the control information according to a selected editing sub-unit, and generates a meta instruction list; or parses a received meta instruction list, and updates the control information; and
  the information storage module is configured to store the received meta instruction list and a to-be-sent information instruction list.

14. An instant messaging client, configured to implement an instant messaging method according to claim 7, comprising an information collection module, a graph grid control module, a graph grid editing module, an information storage module, and an information library, wherein
  the information collection module is configured to obtain contact information of a graph grid input interface, and determine a selected graph grid according to the contact information;
  the graph grid control module obtains control information of the graph grid according to a position identifier of the selected graph grid, and controls display of an icon and play of a soundmark according to the control information;
  the information library is configured to store the icon and/or the soundmark;
  the graph grid editing module updates the control information according to a selected editing sub-unit, and generates a meta instruction list; or parses a received meta instruction list, and updates the control information; and
  the information storage module is configured to store the received meta instruction list and a to-be-sent information instruction list.

* * * * *